US008504076B2

(12) United States Patent
Takahashi

(10) Patent No.: US 8,504,076 B2
(45) Date of Patent: Aug. 6, 2013

(54) LOCATION POSITIONING APPARATUS, LOCATION POSITIONING METHOD, AND LOCATION POSITIONING PROGRAM

(75) Inventor: Makoto Takahashi, Yokosuka (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 13/393,756

(22) PCT Filed: Aug. 24, 2010

(86) PCT No.: PCT/JP2010/005209
§ 371 (c)(1),
(2), (4) Date: Mar. 1, 2012

(87) PCT Pub. No.: WO2011/027513
PCT Pub. Date: Mar. 10, 2011

(65) Prior Publication Data
US 2012/0165045 A1 Jun. 28, 2012

(30) Foreign Application Priority Data
Sep. 2, 2009 (JP) .................. 2009-202611

(51) Int. Cl.
*H04W 24/00* (2009.01)
*G01C 21/00* (2006.01)
*G01S 19/00* (2010.01)
(52) U.S. Cl.
USPC .................. 455/456.3; 455/456.1; 455/456.6; 342/357.2; 701/213
(58) Field of Classification Search
USPC ....................................... 455/456.3
See application file for complete search history.

(56) References Cited

U.S. PATENT DOCUMENTS

| 6,941,145 B2 | 9/2005 | Ogino et al. | |
|---|---|---|---|
| 6,993,345 B2 | 1/2006 | Ogino et al. | |
| 2003/0036389 A1* | 2/2003 | Yen | 455/456 |
| 2004/0117114 A1* | 6/2004 | Diggelen | 701/213 |

(Continued)

FOREIGN PATENT DOCUMENTS

| JP | 2002196063 | * 12/2000 |
|---|---|---|
| JP | 2001-337149 A | 12/2001 |

(Continued)

OTHER PUBLICATIONS

PCT/JP2010/005209 PCT/IB/338, dated Apr. 19, 2012, 1 page.

(Continued)

*Primary Examiner* — Timothy Pham
(74) *Attorney, Agent, or Firm* — Crowell & Moring LLP

(57) ABSTRACT

A location positioning apparatus, a location positioning method, and a location positioning program are provided for shortening the wait time necessary for positioning, by changing the timeout period in the positioning measurement according to the accuracy of the general location, when the current location cannot be positioned. A general location error determining unit (22*e*) determines an error radius of the general location, a timeout period setting unit (22*g*) sets timeout periods T1 to T3 and Tmax in the positioning measurement, according to the error radius determined by the general location error determining unit (22*e*). A location positioning process timeout instructing unit (22*h*) time outs the location positioning process being performed by a location positioning processing unit (22*d*), when a number of visible satellites S is smaller than a prescribed number at each of the timeout periods T1 to T3, or when the timeout period Tmax elapses.

3 Claims, 10 Drawing Sheets

U.S. PATENT DOCUMENTS

| | | | |
|---|---|---|---|
| 2009/0061898 A1* | 3/2009 | Johnson et al. | 455/456.2 |
| 2009/0069031 A1* | 3/2009 | Burroughs et al. | 455/456.2 |
| 2009/0069032 A1* | 3/2009 | Rowland et al. | 455/456.2 |
| 2009/0149201 A1* | 6/2009 | Ryu et al. | 455/456.6 |
| 2010/0066601 A1* | 3/2010 | Abraham et al. | 342/357.02 |

FOREIGN PATENT DOCUMENTS

| | | |
|---|---|---|
| JP | 2003-78940 A | 3/2003 |
| JP | 2003-161772 A | 6/2003 |
| JP | 2004-037392 A | 2/2004 |
| JP | 2004-254229 A | 9/2004 |
| JP | 2008-051808 A | 3/2008 |
| JP | 2009-130781 A | 6/2009 |
| JP | 2010-139247 A | 6/2010 |

OTHER PUBLICATIONS

PCT/JP2010/005209 PCT/IB/373, dated Apr. 11, 2012, 1 page.
PCT/JP2010/005209 PCT/ISA/237 (Translation), dated Dec. 7, 2010, 5 pages.
PCT/JP2010/005209 PCT/ISA/210, dated Dec. 7, 2010, 2 pages.

* cited by examiner

FIG. 5

| ERROR RADIUS (km) | TIMEOUT PERIOD (SECOND) | | | | NUMBER OF POSITIONING TIMES (NUMBER OF TIMES) | LOCATION POSITIONING SUCCESS RATE (%) | LOCATION POSITIONING ERROR DETERMINATION RATE (%) |
|---|---|---|---|---|---|---|---|
| | T1 | T2 | T3 | Tmax | | | |
| 150 | 30 | 45 | 75 | 90 | 73 | 85 | 0 |
| 450 | 40 | 60 | 80 | 90 | 65 | 74 | 0 |
| 750 | | | | | 63 | 56 | 0 |
| 1000 | | | | | 62 | 45 | 0 | ly) # LOCATION POSITIONING APPARATUS, LOCATION POSITIONING METHOD, AND LOCATION POSITIONING PROGRAM

TECHNICAL FIELD

The present invention relates to a location positioning apparatus, a location positioning method, and a location positioning program, and in particular to, a location positioning apparatus, a location positioning method, and a location positioning program with the use of Global Positioning System (GPS).

BACKGROUND ART

In these years, there are lots of location positioning apparatuses with the use of GPS. Examples are car navigation systems, mobile telephones, and the like. For instance, as to mobile telephones familiar to us, the services are provided to identify the user's current location and guide the user to a destination with a dedicated map application downloaded to operate on a GPS mobile telephone equipped with the GPS function.

As an example, regarding the GPS positioning function of the mobile telephone also provided overseas, assist data including trajectory information of satellites or current time information, general location information indicating the user's rough location, and the like, is generated on the communication network side. The assist data is notified to the mobile telephone via the communication network so that GPS satellite search process or the positioning arithmetic process are performed in consideration of the assist data on the mobile telephone side. Assisted Global Positioning System (AGPS) tends to be often employed in these years.

As to the accuracy of the general position of the assist data in this AGPS, the error range can be set to a radius area from 0 to 1800 km in the standard specification. This enables the identification of the location information ranging from a cell-level range extremely close to an actual current location to a nation-level range. In addition, the error range significantly differs depending on the communication operator, in each nation, for providing the GPS function. Furthermore, it is already known that when the accuracy of the above general location is low, the accuracy of the positioning result in AGPS is also low.

Accordingly, in the mobile telephone with the use of AGPS, even in a case where a relatively wide area of the general location is identified, about 90 seconds, for example, is set to a timeout period for ending, that is, timing out the positioning measurement in order to increase the positioning success rate, even if the positioning measurement result is not acquirable.

Patent Document 1, however, discloses a location positioning apparatus for determining firstly whether or not a user is located in a radio wave coverage, when the user carries out an operation for acquiring the location information, and for acquiring the location information of the terminal, only when the user is located in the radio wave coverage. This intends to eliminate the need of the operation for acquiring the location information again when the user moves into the radio wave coverage, once the user carries out the operation for acquiring the location information while staying at the outside of the radio wave coverage.

PRIOR ART DOCUMENTS

Patent Documents

Patent Document 1: JP 2009-130781 A

SUMMARY OF THE INVENTION

Problem to be Solved

In a place where the radio wave is weak, such as in a building or underground street, the positioning result is not always acquirable within the timeout period, even if the location positioning apparatus described in Patent Document 1 is located in the radio wave coverage. For this reason, the waiting time since the user starts the positioning process until the user knows that the positioning result is not acquirable may be longer.

Hence, in consideration of the above problem, the present invention has an object to provide a location positioning apparatus, a location positioning method, and a location positioning program, in which it is made possible to shorten the waiting time necessary for the positioning when the current location cannot be positioned, by changing timeout periods in the positioning measurement according to the accuracy in the general location.

Solution to the Problem

A location positioning apparatus, a location positioning method, and a location positioning program according to the present invention are configured as follows.

According to an aspect of the present invention, there is provided a location positioning apparatus comprising: a GPS radio wave receiver for receiving a radio wave of GPS; a mobile telephone radio wave receiver for receiving a radio wave of a mobile telephone; a location positioning processing unit for performing a location positioning process for positioning a current location based upon the radio wave of the GPS received by the GPS radio wave receiver; a general location error determining unit for determining an error radius of a general location identified based upon the radio wave of the mobile telephone received by the mobile telephone radio wave receiver; a visible satellite number determining unit for determining a number of visible satellites capable of receiving the radio wave of the GPS by the GPS radio wave receiver; a timeout period setting unit for setting a plurality of timeout periods for timing out the location positioning process being performed by the location positioning processing unit according to the error radius of the general location determined by the general location error determining unit; and a location positioning process timeout instructing unit for outputting a location positioning process timeout instruction for timing out the location positioning process being performed by the location positioning processing unit, when an elapsed time since the location positioning process starts becomes any one of the plurality of timeout periods set by the timeout period setting unit, in a case where the number of the visible satellites determined by the number of visible satellites determining unit is smaller than a prescribed value.

According to the above location positioning apparatus, plural timeout periods are set according to the error radius of the general location. This enables the wait time necessary for the location positioning process when the current location cannot be positioned.

In addition, the plurality of timeout periods set by the timeout period setting unit may include first to fourth timeout periods, the number of visible satellites determining unit may determine whether or not the number of the visible satellites is one or more when the elapsed times becomes the first timeout period, may determine whether or not the number of the visible satellites is two or more when the elapsed times becomes the second timeout period longer than the first timeout period, and may determine whether or not the number of the visible satellites is three or more when the elapsed times becomes the third timeout period longer than the second timeout period, and the location positioning process timeout instructing unit may output the location positioning process timeout instruction for timing out the location positioning process being performed by the location positioning processing unit, when the number of the visible satellites determined within the first to third timeout periods is smaller than the number of the visible satellites that is a determination condition, or when the elapsed time becomes the fourth timeout period longer than the third timeout period.

According to the above location positioning apparatus, the first to third timeout periods are set, so that whether or not the number of the visible satellites becomes a prescribed one at each of the timeout period for the timeout process. Therefore, in all number of times for positioning, although positioning is possible in the fourth timeout period that is the longest one, the success rate of the location positioning can be increased by lowering the location positioning error determination rate that is a rate of the number when positioning is timed out and cannot be positioned in the first to third timeout periods.

Furthermore, the visible satellite number determining unit may regard, when at least one of a C/N ratio and an S/N ratio of the radio wave of the GPS received by the GPS radio wave receiver, a satellite transmitting the radio wave as the visible satellite transmitting the radio wave, and may determine the number of the visible satellites.

According to the above location positioning apparatus, the number of visible satellites is determined based upon at least one of the C/N ratio and the S/N ratio of the radio wave of the GPS received by the GPS radio wave receiver, so that the location positioning process timeout instructing unit for outputting the location positioning process timeout instruction for timing out the location positioning process.

According to another aspect of the present invention, there is provided a location positioning method comprising: a GPS radio wave receiving step of receiving a radio wave of GPS; a mobile telephone radio wave receiving step of receiving a radio wave of a mobile telephone; a location positioning processing step of performing a location positioning process for positioning a current location based upon the radio wave of the GPS received by the GPS radio wave receiving step; a general location error determining step (corresponding to the process of step S102 in FIG. 6, for example) of determining an error radius of a general location identified based upon the radio wave of the mobile telephone received by the mobile telephone radio wave receiving step; a visible satellite number determining step (corresponding to the process of step S103 in FIG. 6, for example) of determining a number of visible satellites capable of receiving the radio wave of the GPS by the GPS radio wave receiving step; a timeout period setting step (corresponding to the process of step S106 in FIG. 6, for example) of setting a plurality of timeout periods for timing out the location positioning process being performed by the location positioning processing step according to the error radius of the general location determined by the general location error determining step; and a location positioning process timeout instructing step (corresponding to the process of step S107 in FIG. 6, for example) of outputting a location positioning process timeout instruction for timing out the location positioning process being performed by the location positioning processing step, when an elapsed time since the location positioning process starts becomes anyone of the plurality of timeout periods set by the timeout period setting step, in a case where the number of the visible satellites determined by the visible satellite number determining step is smaller than a prescribed value.

According to yet another aspect of the present invention, there is provided a location positioning program for operating a computer to function as a location positioning apparatus, the location positioning apparatus comprising: a GPS radio wave receiver for receiving a radio wave of GPS; a mobile telephone radio wave receiver for receiving a radio wave of a mobile telephone; a location positioning processing unit for performing a location positioning process for positioning a current location based upon the radio wave of the GPS received by the GPS radio wave receiver; a general location error determining unit for determining an error radius of a general location identified based upon the radio wave of the mobile telephone received by the mobile telephone radio wave receiver; a visible satellite number determining unit for determining a number of visible satellites capable of receiving the radio wave of the GPS by the GPS radio wave receiver; a timeout period setting unit for setting a plurality of timeout periods for timing out the location positioning process being performed by the location positioning processing unit according to the error radius of the general location determined by the general location error determining unit; and a location positioning process timeout instructing unit for outputting a location positioning process timeout instruction for timing out the location positioning process being performed by the location positioning processing unit, when an elapsed time since the location positioning process starts becomes any one of the plurality of timeout periods set by the timeout period setting unit, in a case where the number of the visible satellites determined by the visible satellite number determining unit is smaller than a prescribed value.

According to the above location positioning program, when the program is read out by a computer and the processes are executed by the program that has been read out, the same effects as those of the above location positioning apparatus are obtainable.

Advantageous Effects of the Invention

According to the present invention, it is made possible to shorten the user's waiting time by timing out the location positioning process in a prescribed timeout period set according to the error radius, when the operation for acquiring the location information is carried out at a place where the radio wave is weak and the location positioning process cannot be performed, such as in a building or underground street.

Furthermore, since it is possible to not only shorten the user's waiting time but also save the power, in a case where the electric source of the location positioning apparatus is a battery, it is possible to suppress its consumption.

BRIEF DESCRIPTION OF THE DRAWINGS

FIG. 5 a table 32 illustrative of a second setting example of the timeout periods T1 to T3 and Tmax set by the timeout period setting unit 22g according to the error radius;

DESCRIPTION OF EMBODIMENTS

Figure 1:
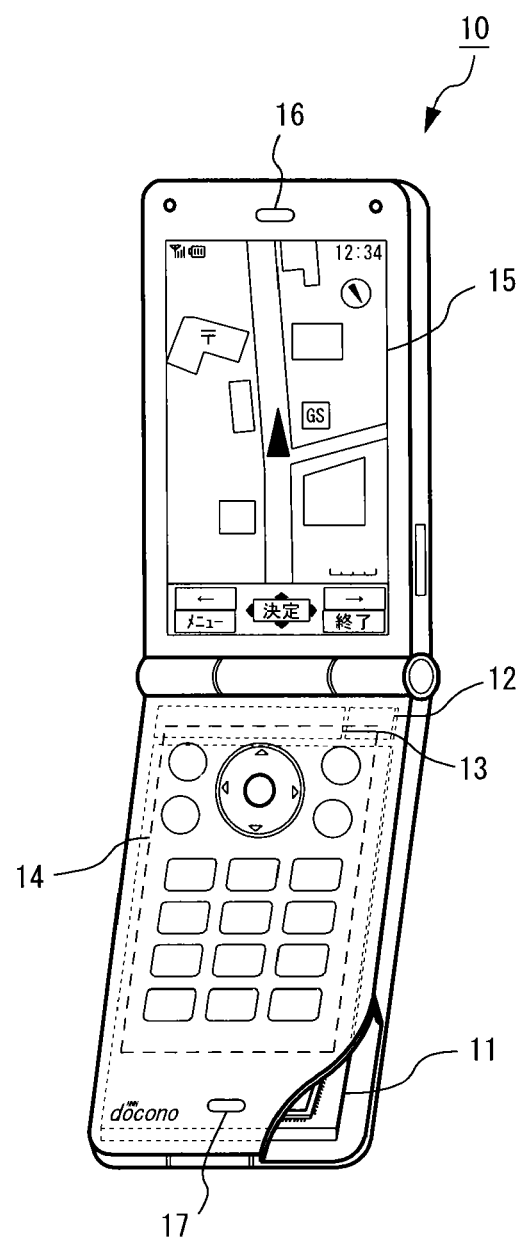
FIG. 1 is a perspective view illustrative of a configuration of a mobile telephone 10 equipped with the GPS function.

Hereinafter, preferred embodiments of the present invention will be described with reference to the attached drawings. Specifically, in each of the drawings to be referred to in the following description, the same components in each of the drawings are indicated by the identical reference numerals.
(Apparatus Configuration of Mobile Telephone 10 Equipped with GPS Function)

Firstly, referring to FIG. 1, an apparatus configuration of the mobile telephone 10 equipped with a GPS function will be described as an example of a location positioning apparatus according to the present invention. FIG. 1 is a perspective view illustrative of a configuration of the mobile telephone 10 equipped with the GPS function.

The mobile telephone 10 equipped with the GPS function illustrated in FIG. 1 is provided with: a controller 11; a GPS antenna 12; a communication antenna 13; operation keys 14; a liquid crystal display 15; a speaker 16; and a microphone 17.

The controller 11 is composed of a microcomputer, for example, and is built in the mobile telephone 10 equipped with the GPS function. The controller 11 is connected to each of the above components constituting the mobile telephone 10 equipped with the GPS function, transmits and receives data signals and control signals, and controls the entire mobile telephone 10 equipped with the GPS function in a unified manner.

The GPS antenna 12 is a built-in antenna for receiving the radio waves including the GPS data, necessary for positioning the location, transmitted from the GPS satellite.

The communication antenna 13 is a built-in antenna for receiving the radio waves of mobile telephone signals relating to the communication of the mobile telephone from the base transceiver station of the communication operator. Specifically, this mobile telephone signal includes the assist data including the general location data necessary for identifying the general location transmitted from a server such as a Secure User Plane for Location (SUPL) server of the communication operator for providing the AGPS, and error radius (or the general location accuracy) data indicating the error radius.

The operation keys 14 are composed of numeric keys of "0" to "9", a call start key, and a call end key, which are keys for the user to operate for a call or location positioning. A GPS shortcut key may be provided for directly activating the GPS function.

The liquid crystal display 15 displays to the user the calling state, the current location with the GPS function, and the like. Additionally, without limiting the liquid crystal display 15, a liquid crystal display equipped with a touch panel, for example, may be employed to operate the GPS function with the use of the touch panel.

The speaker 16 outputs sound to the user. This speaker 16 is used for a call or vocal guidance of the GPS function.

The microphone (hereinafter, referred to as MIC) 17 inputs user's voices. The MIC 17 is used for voice input for a call or the GPS function.
(Functional Configuration of Mobile Telephone 10 Equipped with the GPS Function)

Figure 2:
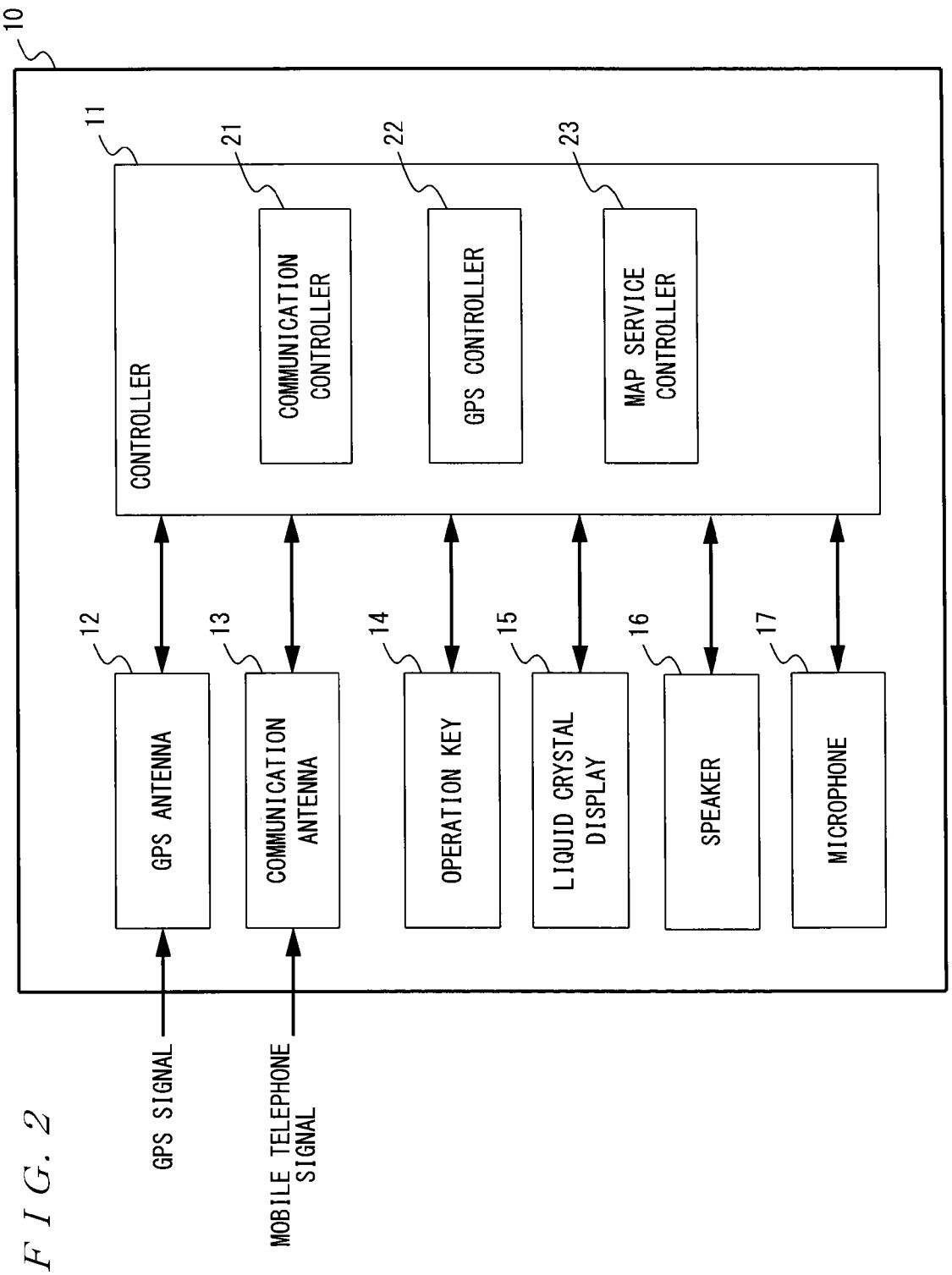
FIG. 2 is a block diagram illustrative of a functional configuration of the mobile telephone 10 equipped with GPS.

Subsequently, referring to FIG. 2, a functional configuration of the mobile telephone 10 equipped with the GPS function will be described. FIG. 2 is a block diagram illustrative of a functional configuration of the mobile telephone 10 equipped with the GPS function.

The controller 11 of the mobile telephone 10 equipped with the GPS function illustrated in FIG. 2 is provided with functions of: a communication controller 21; a GPS controller 22; and a map service controller 23. Then, the communication controller 21, the GPS controller 22, and the map service controller 23 are connected to each of the components constituting the above-described mobile telephone 10 equipped with the GPS function, and transmits and receives the data signals and control signals as indicated by arrows in the drawing.

The communication controller 21 controls the entire operations relating to the call and data communication. The communication controller 21 is configured to operate by the above-described microcomputer carrying out the communication control application.

The GPS controller 22 controls the location positioning process and the like for location positioning with the use of the GPS function. The GPS controller 22 is configured to operate by the above-described microcomputer carrying out the communication control application, in the same manner as the communication controller 21.

The map service controller 23 controls the provision of map service in cooperation with the location positioning with the GPS. The map service controller 23 is configured to operate by the user performing the map service application, dedicated for mobile use, after downloading it via the mobile telephone communication network. For example, the map service application provides a navigation service or a store and facility search service based upon the current location.
(Functional Configuration of GPS Controller 22)

Figure 3:
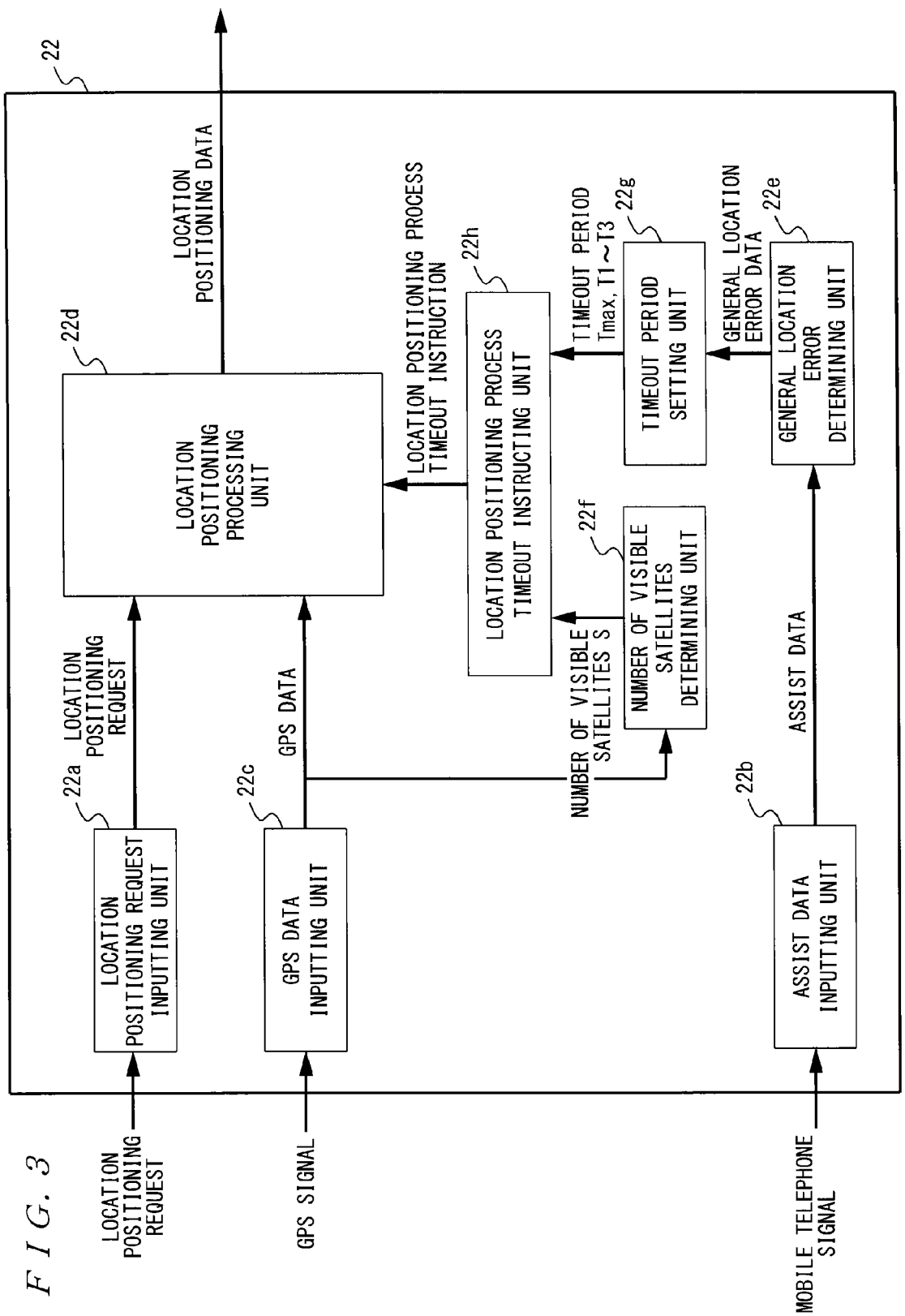
FIG. 3 is a block diagram illustrative of a functional configuration of a GPS controller 22.

Subsequently, referring to FIG. 3, the functional configuration of the GPS controller 22 will be described. FIG. 3 is a block diagram illustrative of the functional configuration of the GPS controller 22.

The GPS controller 22 illustrated in FIG. 3 is provided with the functional parts including: a location positioning request inputting unit 22a; an assist data inputting unit 22b; a GPS data inputting unit 22c; a location positioning processing unit 22d; a general location error determining unit 22e; a visible satellite number determining unit 22f; a timeout period setting unit 22g; and a location positioning process timeout instructing unit 22h.

The location positioning request inputting unit 22a inputs a location positioning request for starting a location positioning process to be output from the map service controller 23, by, for example, the user carrying out the operation for starting the location positioning on the map application. In addition to the location positioning request for starting the location positioning, the location positioning request inputting unit 22a also inputs the location positioning request for ending the location positioning.

The assist data inputting unit 22b inputs the mobile telephone signal received by the communication antenna 13 to acquire the assist data included in the mobile telephone signal.

The GPS data inputting unit 22c inputs the GPS data included in the radio wave received by the GPS antenna 12.

Upon reception of the location positioning request from the location positioning request inputting unit 22a, the location positioning processing unit 22d performs the location positioning process of the mobile telephone 10 equipped with the GPS function based upon the GPS data output from the GPS data inputting unit 22c, and performs the location positioning process for outputting the location positioning data of the mobile telephone 10 equipped with the GPS function. In addition, when the location positioning process timeout instructing unit 22h inputs into the location positioning processing unit 22d a location positioning process timeout instruction for ending, that is, timing out the location positioning process, the location positioning processing unit 22d times out the location positioning process by outputting an error result even if the positioning measurement data cannot be acquired.

The general location error determining unit 22e performs a general location error radius determining process for determining the error radius of the general location, based upon the general location data or the error radius data included in the assist data output from the assist data inputting unit 22b. For example, when the general location is determined at a cell level by the general location error determining unit 22e, the error radius is smaller than that of a case where the general location is identified at a nation range. Conversely, when the general location is determined at the nation-level range by the general location error determining unit 22e, the error radius is larger than that of the case where the general location is determined at a cell level.

When a Carrier to Noise (C/N) ratio of the radio waves received by the GPS antenna 12 is equal to or greater than a prescribed value, the visible satellite number determining unit 22f presumes the GPS satellite transmitting the radio waves as a visible satellite, and performs a visible satellite number determining process for determining the number of the visible satellites S. Additionally, without limiting the C/N ratio, a Signal to Noise (S/N) ratio or both of them may be used, when the number of the visible satellites S is determined. That is, at least one of the C/N ratio and S/N ratio may be used for determination. Furthermore, the number of the visible satellites S may be determined, by regarding the GPS as a visible satellite transmitting the radio waves with which it is determined that the process ends normally at the process step when the location positioning processing unit 22d outputs the location positioning data.

The timeout period setting unit 22g performs a timeout period setting process for setting the timeout periods T1 to T3 and Tmax for ending, that is, timing out the positioning measurement according to the error radius determined by the general location error determining unit 22e, even if the positioning measurement result cannot be acquired. The timeout period Tmax is the longest period of the timeout period, and is set to 90 seconds, for example, according to the present embodiment. Moreover, the timeout periods T1 to T3 are set within the range of the timeout period Tmax.

As to the GPS, it is possible to perform the location positioning process, when the radio waves can be received from at least three of plural satellites orbiting the face of the Earth. Therefore, according to the present embodiment, the timeout period T1 is a period for timing out the location positioning process when the number of the visible satellites S is not one or more. The timeout period T2 is a period for timing out the location positioning process when the number of the visible satellites S is not two or more. The timeout period T3 is a period for timing out the location positioning process when the number of the visible satellites S is not three or more. The number of the visible satellites S determined by each timeout period and the timeout periods T1 to T3 and Tmax can be arbitrarily set within a practically permissible range.

The location positioning process timeout instructing unit 22h measures a location positioning process elapsed time T that is an elapsed time from the start of the location positioning process. When the location positioning process elapsed time T becomes the timeout periods T1 to T3 and Tmax set by the timeout period setting unit 22g, and the number of the visible satellites S determined by the visible satellite number determining unit 22f is smaller than the above-described number, the location positioning process timeout instructing unit 22h outputs to the location positioning processing unit 22d the location positioning process timeout instruction for timing out the location positioning process.

(Setting Examples of Timeout Periods T1 to T3 and Tmax to be Set by the Timeout Period Setting Unit 22g According to Error Radius)

Figure 4:
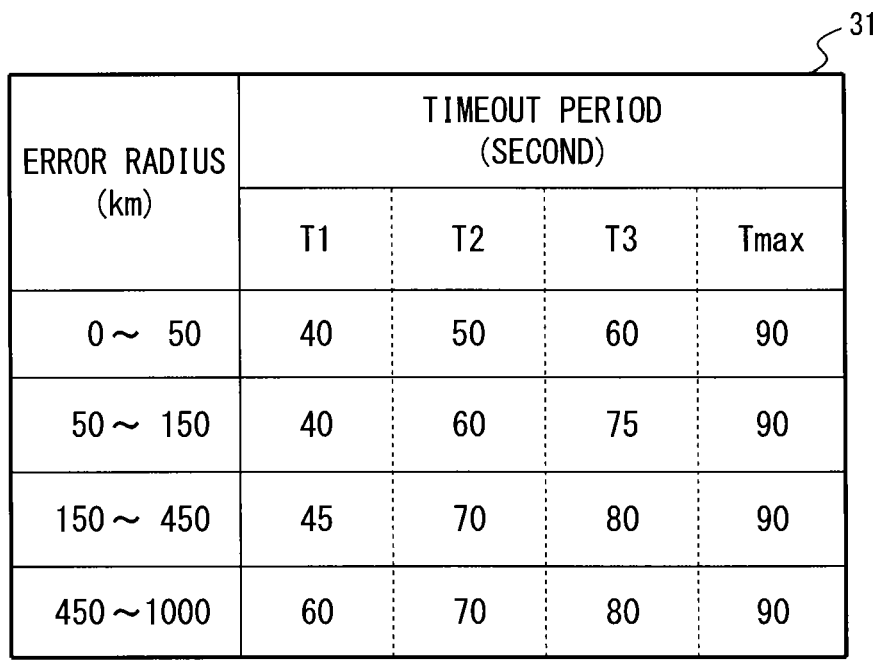
FIG. 4 is a table 31 illustrative of a first setting example of timeout periods T1 to T3 and Tmax set by a timeout period setting unit 22g according to an error radius.

Subsequently, referring to FIG. 4 and FIG. 5, setting examples of the timeout periods T1 to T3 and Tmax set by the timeout period setting unit 22g according to the error radius. FIG. 4 is a table 31 illustrative of a first setting example of the timeout periods T1 to T3 and Tmax set by the timeout period setting unit 22g according to the error radius. Additionally, FIG. 5 is a table 32 illustrative of a second setting example of the timeout periods T1 to T3 and Tmax set by the timeout period setting unit 22g according to the error radius.

Firstly, as illustrated in the table 31 of FIG. 4, when the general location error determining unit 22e determines that the error radius is 0 to 50 km, the timeout period setting unit 22g sets the timeout period Tmax at 90 seconds. Simultaneously, within a range of 90 seconds of the timeout period Tmax, the timeout T1 is set to 40 seconds, the timeout T2 is set to 50 seconds, and the timeout T3 is set to 60 seconds, respectively.

In addition, when the general location error determining unit 22e determines that the error radius is 50 km to 150 km, the timeout period setting unit 22g sets the timeout period Tmax at 90 seconds. Simultaneously, within a range of 90 seconds of the timeout period Tmax, the timeout T1 is set to 40 seconds, the timeout T2 is set to 60 seconds, and the timeout T3 is set to 75 seconds, respectively.

Similarly, also when the general location error determining unit 22e determines that the error radius is 150 km to 450 km and 450 km to 1000 km, the timeout period setting unit 22g sets the timeout periods T1 to T3 and Tmax, as illustrated in the table 31 of FIG. 4.

On the other hand, as illustrated in the table 32 of FIG. 5, when the general location error determining unit 22e determines that the error radius is 150 km or 450 km, the timeout period setting unit 22g sets the timeout period Tmax at 90 seconds. Simultaneously, within a range of 90 seconds of the timeout period Tmax, the timeout T1 is set to 30 seconds, the timeout T2 is set to 45 seconds, and the timeout T3 is set to 75 seconds, respectively.

These timeout periods T1 to T3 can be arbitrarily set within the range of the timeout period Tmax. However, as illustrated in the table 32, it is desirable to set the timeout periods T1 to T3 so that an erroneous determination rate is 0% or falls within a practically permissible range, the erroneous determination rate being a rate of the number of times where the positioning cannot be carried out, with respect to the number of positioning times, because the positioning is timed out by the timeout periods T1 to T3 although the positioning is enabled by the timeout period Tmax.

Additionally, in a case where the characteristics are not significantly changed even if the timeout period setting unit 22g sets different timeout periods T1 to T3 and Tmax, respectively, with different error radii, the timeout periods T1 to T3 and Tmax may be set at same values with those of the case where the general location error determining unit 22e determines that the error radius is 150 km or 450 km.

Similarly, also when the general location error determining unit 22e determines that the error radius is 750 km or 1000 km, the timeout period setting unit 22g sets the timeout period Tmax at 90 seconds. Simultaneously, within a range of 90 seconds of the timeout period Tmax, the timeout T1 is set to 40 seconds, the timeout T2 is set to 60 seconds, and the timeout T3 is set to 80 seconds, respectively.

As the error radius determined by the general location error determining unit 22e becomes larger, the location positioning success rate is gradually lower. However, as described above, it is desirable to set the timeout periods T1 to T3 so that the error determination rate is 0% or fall within a practically permissible range.

As described above, the timeout period setting unit 22g sets the timeout periods T1 to T3 and Tmax, respectively, according to the error radius determined by the general location error determining unit 22e.

(A Series of Flows in the Location Positioning Process in the Mobile Telephone 10 Equipped with the GPS Function)

Figure 6:
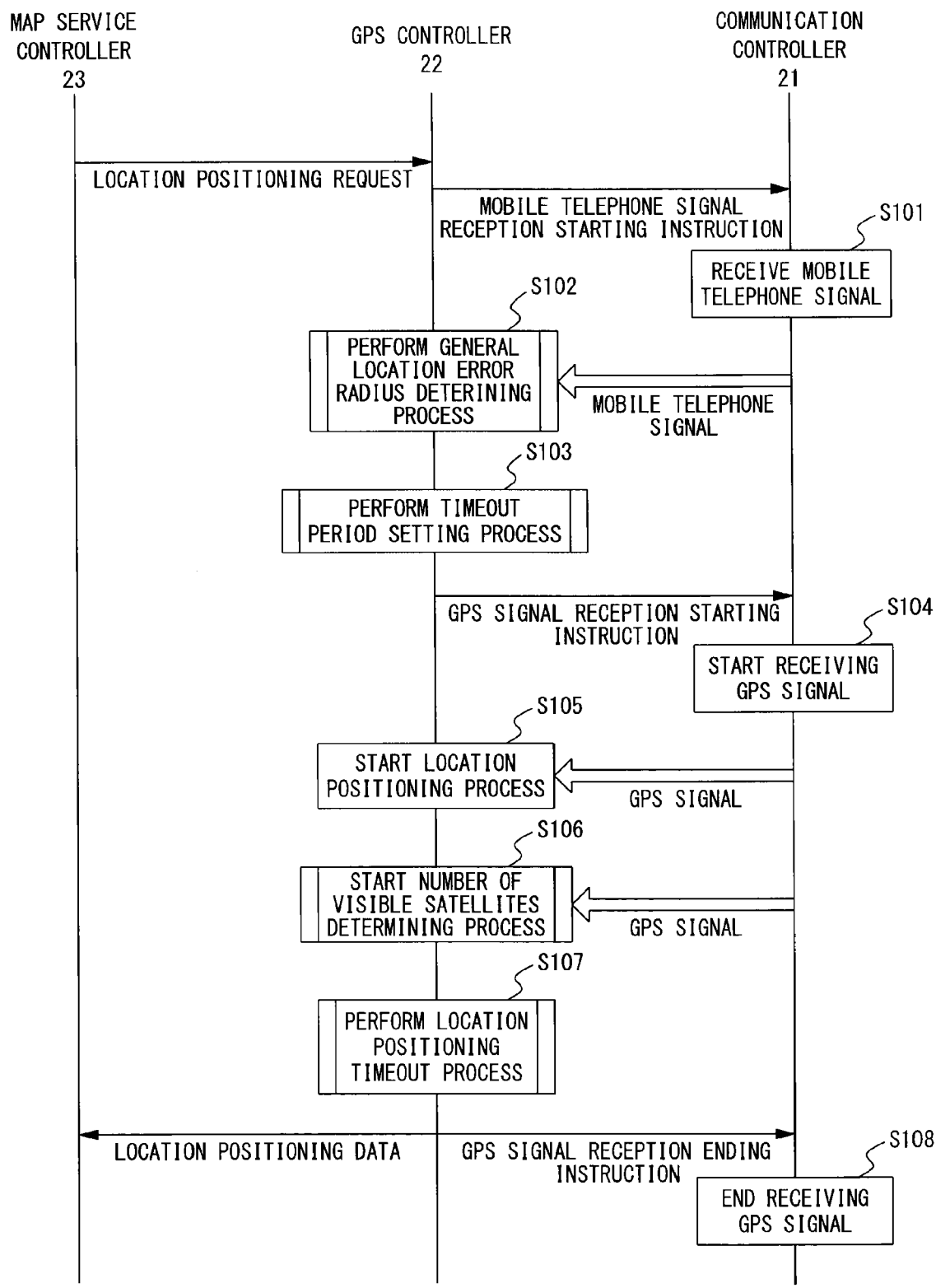
FIG. 6 is a sequence chart illustrative of a series of flows in a location positioning process in the mobile telephone 10 equipped with GPS.

Referring now to FIG. 6, a series of flows in the location positioning process in the mobile telephone 10 equipped with the GPS function will be described. FIG. 6 is a sequence chart illustrative of the series of flows in the location positioning process in the mobile telephone 10 equipped with the GPS function.

In the series of flows in the location positioning process illustrated in FIG. 6, firstly, the location positioning request inputting unit 22a of the GPS controller 22 receives the location positioning request from the map service controller 23. The location positioning request inputting unit 22a outputs to the communication controller 21 a mobile telephone signal reception starting instruction to start receiving, by the communication antenna 13, the radio waves of the mobile telephone signals. The communication controller 21 controls the reception of the radio waves of the mobile telephone signals (step S101), and outputs the received mobile telephone signal to the GPS controller 22.

In the GPS controller 22, the assist data inputting unit 22b receives the mobile telephone signal, and the general location error determining unit 22e performs the general location error radius determining process for determining the error radius of the general location of the location positioning data from the assist data included in the mobile telephone signal (step S102).

Subsequently, in the GPS controller 22, the timeout period setting unit 22g performs the timeout period setting process for setting the timeout periods T1 to T3 and Tmax according to the error radius determined by the general location error radius determining process (step S103).

The GPS controller 22 outputs to the communication controller 21 the GPS signal reception starting instruction to start receiving, by the GPS antenna 12, the radio waves of the GPS signals. The communication controller 21 controls the reception of the radio waves of the GPS signals (step S104), and outputs the received GPS signals to the GPS controller 22.

In the GPS controller 22, the location positioning processing unit 22d starts the location positioning process of the mobile telephone 10 equipped with the GPS function, based upon the GPS signal (step S105). Simultaneously, the visible satellite number determining unit 22f starts the visible satellite number determining process for determining the number of the visible satellites S based upon the received GPS signal (step S106). Moreover, the location positioning process timeout instructing unit starts the location positioning timeout process for outputting the timeout instruction based upon the timeout periods set in the timeout period setting process and the number of the visible satellites S determined in the visible satellite number determining process (step S107).

When the location positioning process normally ends or ends at the timeout period, the GPS controller 22 outputs to the communication controller 21 a GPS signal reception ending instruction to end receiving, by the GPS antenna 12, the radio waves of the GPS signals. The communication controller 21 performs to control the reception of the radio waves of the GPS signals to end (step S108). In addition, in the GPS controller 22, when the actual location positioning process normally ends or ends at the timeout period, the location positioning processing unit 22d outputs to the map service controller 23 the location positioning data acquired by the location positioning process.

(Flow of the General Location Error Radius Determining Process Performed by the General Location Error Determining Unit 22e)

Figure 7:
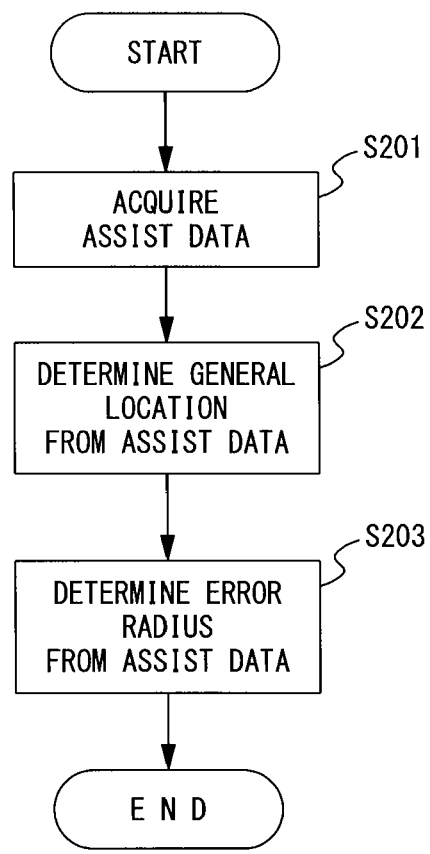
FIG. 7 is a flowchart illustrative of a flow of a general location error radius determining process performed by a general location error determining unit 22e.

Subsequently, FIG. 7 illustrates a flow of the general location error radius determining process performed by the general location error determining unit 22e. FIG. 7 is a flowchart illustrative of the flow of the general location error radius determining process performed by the general location error determining unit 22e.

In the flow of the general location error radius determining process illustrated in FIG. 7, the general location error determining unit 22e acquires the assist data included in the mobile telephone signal input by the assist data inputting unit 22b (step S201). The general location error determining unit 22e determines the general location from the general location data included in the acquired assist data (step S202). Subsequently, the general location error determining unit 22e determines the error radius from the error radius data included in the assist data (step S203).

(Flow of the Timeout Period Setting Process Performed by the Timeout Period Setting Unit 22g)

Figure 8:
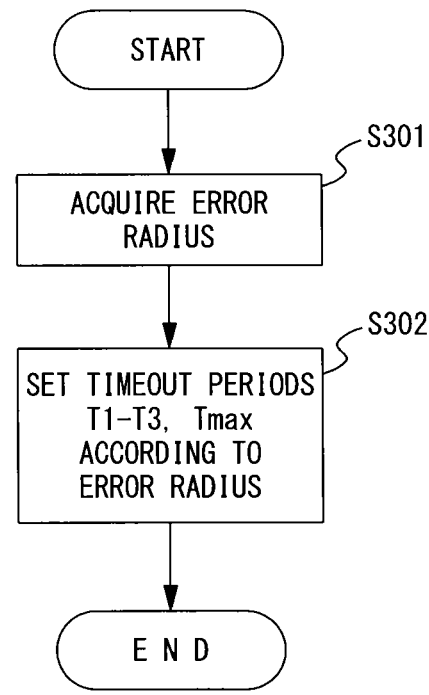
FIG. 8 is a flowchart illustrative of a flow of a timeout period setting process performed by a timeout period setting unit 22g.

Subsequently, FIG. 8 illustrates a flow of the timeout period setting process performed by the timeout period setting unit 22g. FIG. 8 is a flowchart illustrative of the flow of the timeout period setting process performed by the timeout period setting unit 22g.

As illustrated in FIG. 8, firstly, the timeout period setting unit 22g acquires the error radius determined by the general location error determining unit 22e (step S301). Next, the timeout period setting unit 22g sets the timeout periods T1 to T3 and Tmax according to the error radius (step S302).

(Flow of the Number of Visible Satellites Determining Process Performed by the Number of Visible Satellites Determining Unit 22f)

Figure 9:
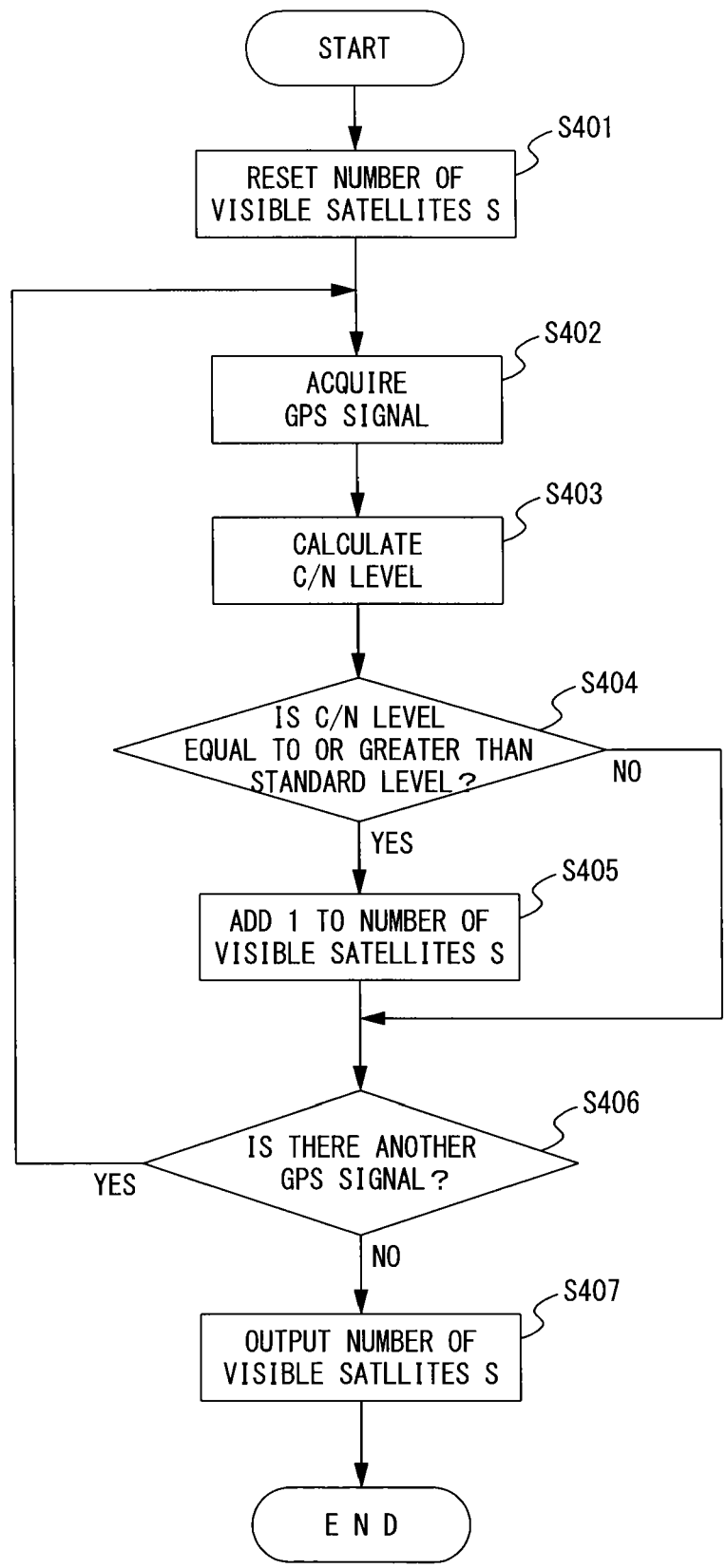
FIG. 9 is a flowchart illustrative of a flow of a number of visible satellites determining process performed by a visible satellite number determining unit 22f.

Subsequently, FIG. 9 illustrates a flow of the visible satellite number determining process performed by the visible satellite number determining unit 22f. FIG. 9 is a flowchart illustrative of the flow of the visible satellite number determining process performed by the visible satellite number determining unit 22f.

In the flow of the visible satellite number determining process illustrated in FIG. 9, the visible satellite number determining unit 22f resets the number of the visible satellites S with 0 (step S401). The visible satellite number determining unit 22f acquires the GPS signal from the GPS data inputting unit 22c (step S402), and calculates the C/N level of the GPS signal (step S403).

On this occasion, when the calculated C/N level is equal to or more than a certain standard value level that does not cause a problem for performing the series of location positioning process (step S404: YES), the visible satellite number determining unit 22f adds 1 to the number of the visible satellites S (step S405). In addition, when the calculated C/N level is smaller than the certain standard value level (step S404: NO), the visible satellite number determining unit 22f does not change the number of the visible satellites S.

Furthermore, when the signals are received from plural visible satellites (step S406: YES), the processing goes back to step S402 and acquires another GPS signal to repeat the above-described process. Then, when processing of all the signals from plural visible satellites is completed (step S406: NO), the visible satellite number determining unit 22f outputs the number of the visible satellites S to the location positioning process timeout instructing unit 22h (step S407).

Specifically, this visible satellite number determining process may be performed continuously at a certain time interval, while the location positioning process is being performed. The visible satellite number determining process may be performed only when the number of the visible satellites S is determined (steps S503, S505, S507 in FIG. 10, as will be described later) after the timeout period of the location positioning process elapses.

(Flow of Timeout Process Performed by the Location Positioning Process Timeout Instructing Unit 22h)

Figure 10:
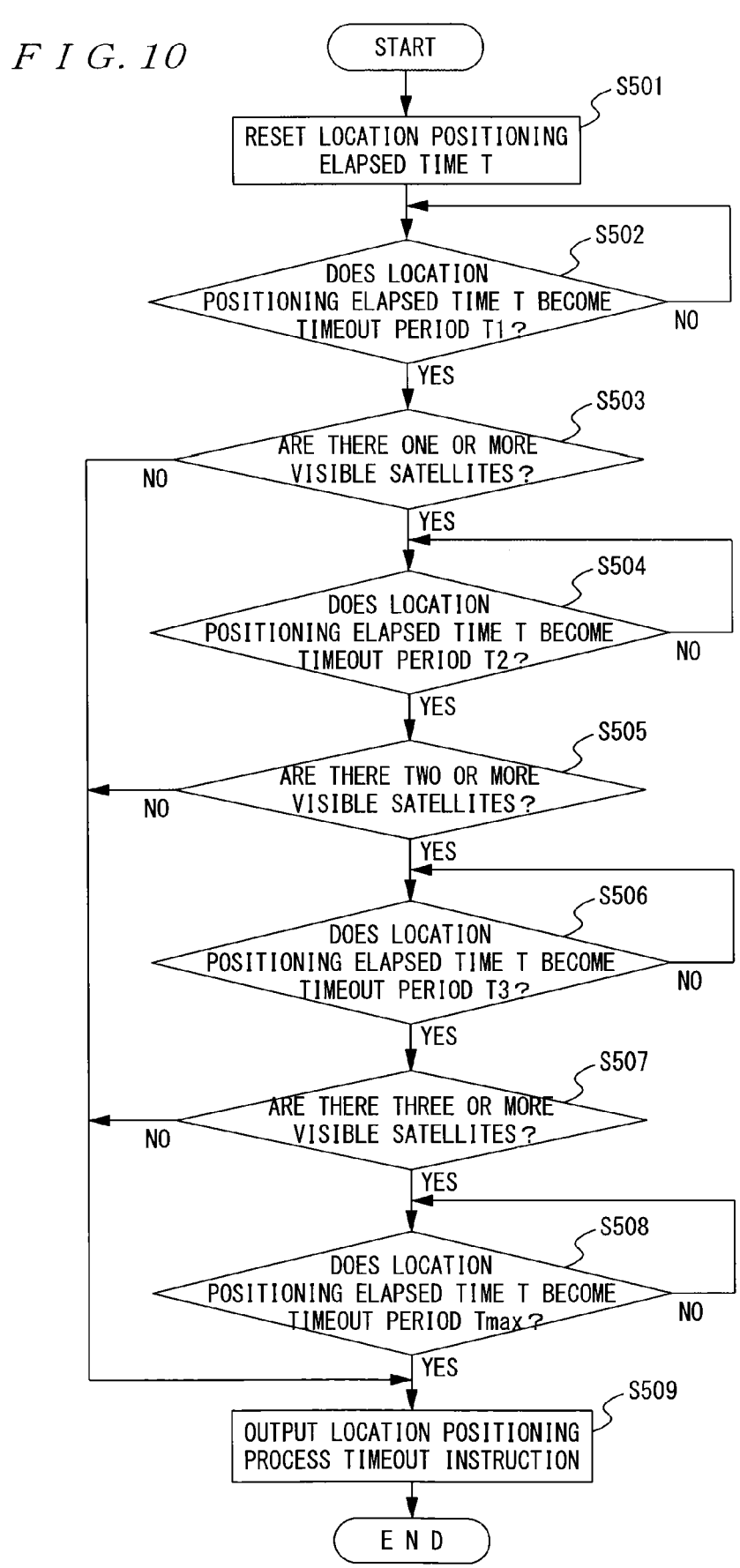
FIG. 10 is a flowchart illustrative of a location positioning timeout process performed by a location positioning process timeout instructing unit 22h.

Subsequently, FIG. 10 illustrates a flow of the location positioning timeout process performed by the location positioning process timeout instructing unit 22h. FIG. 10 is a flowchart illustrative of the location positioning timeout process performed by the location positioning process timeout instructing unit 22h.

In the flow of the visible satellite number determining process illustrated in FIG. 10, the GPS controller 22 resets the location positioning process elapsed time T with 0 (step S501).

The location positioning process timeout instructing unit 22h waits until the location positioning process elapsed time T becomes the timeout period T1 (step S502: NO). Then, when the location positioning process elapsed time T becomes the timeout period T1 (step S502: YES) and the number of the visible satellites S determined by the visible satellite number determining unit 22f is not one or more (step S503: NO), the location positioning process timeout instructing unit 22h presumes that the location positioning is not acquirable by the location positioning process, outputs the location positioning process timeout instruction for timing out the location positioning process to the location positioning processing unit 22d, and ends the location positioning timeout process (step S509).

Moreover, when the location positioning process elapsed time T becomes the timeout period T1 at step S502 and the number of the visible satellites S determined by the number of visible satellite number determining unit 22f is one or more (step S503: YES), the location positioning process timeout instructing unit 22h waits until the location positioning process elapsed time T becomes the timeout period T2 (step S504: NO). Then, when the location positioning process elapsed time T becomes the timeout period T2 and the number of the visible satellites S determined by the visible satellite number determining unit 22f is not two or more (step S505: NO), the location positioning process timeout instructing unit 22h presumes that the location positioning is not acquirable by the location positioning process, outputs the location positioning process timeout instruction for timing out the location positioning process to the location positioning processing unit 22d, and ends the location positioning timeout process (step S509).

Moreover, when the location positioning process elapsed time T becomes the timeout period T2 at step S504 and the number of the visible satellites S determined by the visible satellite number determining unit 22f is two or more (step S505: YES), the location positioning process timeout instructing unit 22h waits until the location positioning process elapsed time T becomes the timeout period T3 (step S506: NO). Then, when the location positioning process elapsed time T becomes the timeout period T3 (step S506: YES) and the number of the visible satellites S determined by the visible satellite number determining unit 22f is not three or more (step S507: NO), the location positioning process timeout instructing unit 22h presumes that the location positioning is not acquirable by the location positioning process, outputs the location positioning process timeout instruction for timing out the location positioning process to the location positioning processing unit 22d, and ends the location positioning timeout process (step S509).

Moreover, when the location positioning process elapsed time T becomes the timeout period T3 at step S506 and the number of the visible satellites S determined by the visible satellite number determining unit 22f is three or more (step S507: YES), the location positioning process timeout instructing unit 22h waits until the location positioning process elapsed time T becomes the timeout period Tmax (step S508: NO). Then, when the location positioning process elapsed time T becomes the timeout period Tmax (step S508: YES), the location positioning process timeout instructing unit 22h outputs the location positioning process timeout instruction for timing out the location positioning process to the location positioning processing unit 22d, and ends the location positioning timeout process (step S509).

Specifically, the case where the location positioning process elapsed time T at step S508 in the above-described process becomes the timeout period Tmax is, for example, a case where the receiving state of the radio waves from the GPS satellite is degraded before the location positioning process ends and the location positioning process does not end normally. However, in the cases where the number of the visible satellites S cannot be acquired due to the accuracy in the general location within the location positioning elapsed time T at steps S502, S504, and S506 in the above-described process, the location positioning process is timed out before the timeout period Tmax. That is to say, when the process is timed out at steps S502, S504, and S506, the location positioning process elapsed time T is made shorter than the timeout period Tmax.

Modifications to the Embodiments

The above embodiments are merely examples, and it would be appreciated that changes may be made in these embodiments without departing from the scope of technical concepts defined in the claims.

For example, in the mobile telephone 10 equipped with the GPS function according to the present embodiment, the timeout period setting unit 22g sets the timeout periods T1 to T3 and Tmax according to the error radius determined by the general location error determining unit 22e. However, the timeout periods T1 to T3 and Tmax may be set by default without consideration of the error radius.

Thus, the location positioning process is performed by use of the timeout period set by default in the location positioning process mode that has a priority in the location accuracy, whereas the location positioning process is performed by use of the timeout period set according to the error radius in the location positioning process mode that has a priority in the process period.

Additionally, in the mobile telephone 10 equipped with the GPS function according to the above-described present embodiment, the description has been given of the case where the assist data with the use of the AGPS is received to determine the error in the general location. However, it is possible to determine the error in the general location and perform the location positioning process with the timeout period set in accordance with the error radius, even if another Global Navigation Satellite System (GNSS) that receives the data with which the error of the general location can be determined like the assist data is employed.

(Conclusion)

The mobile telephone 10 equipped with the GPS function, as described above, includes the general location error determining unit 22e, the timeout period setting unit 22g, the visible satellite number determining unit 22f, and the location positioning process timeout instructing unit 22h.

The general location error determining unit 22e determines the error radius of the location positioning data based upon the error radius data included in the assist data. In addition, the timeout period setting unit 22g sets the timeout periods T1 to T3 and Tmax according to the error radius determined by the general location error determining unit 22e. On the other hand, the visible satellite number determining unit 22f determines the number of the visible satellites S each having the radio wave of GPS equal to or greater than a prescribed value.

Then, when the number of the visible satellites S is not equal to or more than a prescribed value in the timeout periods T1 to T3 and Tmax, the location positioning process timeout instructing unit 22h outputs the location positioning process timeout instruction for timing out the location positioning process to the location positioning processing unit 22d.

It is therefore possible to shorten the user's waiting time, when the operation for acquiring the location information is carried out at a place where the radio wave is weak and the location positioning cannot be performed such as in a building or on an underground street, for example. Furthermore, it is also possible not only to shorten the user's waiting time but also to save the power. Therefore, in a case where the electric source of the location positioning apparatus is a battery, it is possible to suppress its consumption.

INDUSTRIAL APPLICABILITY

The present invention is applicable as an additional function of a mobile telephone equipped with a GPS function, in particular, available overseas.

REFERENCE SIGNS LIST 10 mobile telephone equipped with GPS function
11 controller
12 GPS antenna
13 communication antenna
14 operation key
15 liquid crystal display
16 speaker
17 microphone
21 communication controller
22 GPS controller
22a location positioning request inputting unit
22b assist data inputting unit
22c GPS data inputting unit
22d location positioning processing unit
22e general location error determining unit
22f visible satellite number determining unit
22g timeout period setting unit
22h location positioning process timeout instructing unit
23 map service controller

The invention claimed is:

1. A location positioning apparatus comprising:
a Global Positioning System (GPS) radio wave receiver for receiving a radio wave of GPS;
a mobile telephone radio wave receiver for receiving a radio wave of a mobile telephone;
a location positioning processing unit for performing a location positioning process for positioning a current location based upon the radio wave of the GPS received by the GPS radio wave receiver;
a general location error determining unit for determining an error radius of a general location identified based upon the radio wave of the mobile telephone received by the mobile telephone radio wave receiver;
a visible satellite number determining unit for determining a number of visible satellites capable of receiving the radio wave of the GPS by the GPS radio wave receiver;
a timeout period setting unit for setting a plurality of timeout periods for timing out the location positioning process being performed by the location positioning processing unit according to the error radius of the general location determined by the general location error determining unit; and
a location positioning process timeout instructing unit for outputting a location positioning process timeout instruction for timing out the location positioning process being performed by the location positioning processing unit, when an elapsed time since the location positioning process starts becomes any one of the plurality of timeout periods set by the timeout period setting unit, in a case where the number of the visible satellites determined by the visible satellite number determining unit is smaller than a prescribed value;
wherein the plurality of timeout periods set by the timeout period setting unit includes first to fourth timeout periods;
wherein the visible satellite number determining unit determines whether or not the number of the visible satellites is one or more when the elapsed times becomes the first timeout period, determines whether or not the number of the visible satellites is two or more when the elapsed times becomes the second timeout period longer than the first timeout period, and determines whether or not the number of the visible satellites is three or more when the elapsed times becomes the third timeout period longer than the second timeout period; and
wherein the location positioning process timeout instructing unit outputs the location positioning process timeout instruction for timing out the location positioning process being performed by the location positioning processing unit, when the number of the visible satellites determined within the first to third timeout periods is smaller than the number of the visible satellites that is a determination condition, or when the elapsed time becomes the fourth timeout period longer than the third timeout period.

2. The location positioning apparatus according to claim 1, wherein the visible satellite number determining unit presumes, when at least one of a Carrier to Noise (C/N) ratio and a Signal to Noise (S/N) ratio of the radio wave of the GPS received by the GPS radio wave receiver, a satellite transmitting the radio wave as the visible satellite transmitting the radio wave, and determines the number of the visible satellites.

3. A location positioning method comprising:
- a Global Positioning System (GPS) radio wave receiving step of receiving a radio wave of GPS;
- a mobile telephone radio wave receiving step of receiving a radio wave of a mobile telephone;
- a location positioning processing step of performing a location positioning process for positioning a current location based upon the radio wave of the GPS received by the GPS radio wave receiving step;
- a general location error determining step of determining an error radius of a general location identified based upon the radio wave of the mobile telephone received by the mobile telephone radio wave receiving step;
- a visible satellite number determining step of determining a number of visible satellites capable of receiving the radio wave of the GPS by the GPS radio wave receiving step;
- a timeout period setting step of setting a plurality of timeout periods for timing out the location positioning process being performed by the location positioning processing step according to the error radius of the general location determined by the general location error determining step; and
- a location positioning process timeout instructing step of outputting a location positioning process timeout instruction for timing out the location positioning process being performed by the location positioning processing step, when an elapsed time since the location positioning process starts becomes any one of the plurality of timeout periods set by the timeout period setting step, in a case where the number of the visible satellites determined by the visible satellite number determining step is smaller than a prescribed value;

wherein the plurality of timeout periods set by the timeout period setting step includes first to fourth timeout periods;

wherein the visible satellite number determining step determines whether or not the number of the visible satellites is one or more when the elapsed times becomes the first timeout period, determines whether or not the number of the visible satellites is two or more when the elapsed times becomes the second timeout period longer than the first timeout period, and determines whether or not the number of the visible satellites is three or more when the elapsed times becomes the third timeout period longer than the second timeout period; and wherein the location positioning process timeout instructing step outputs the location positioning process timeout instruction for timing out the location positioning process being performed by the location positioning processing step, when the number of the visible satellites determined within the first to third timeout periods is smaller than the number of the visible satellites that is a determination condition, or when the elapsed time becomes the fourth timeout period longer than the third timeout period.

* * * * *